J. R. AND G. W. ELDER.
ANIMAL TRAP.
APPLICATION FILED MAR. 10, 1919.
1,307,963.
Patented June 24, 1919.
2 SHEETS—SHEET 1.
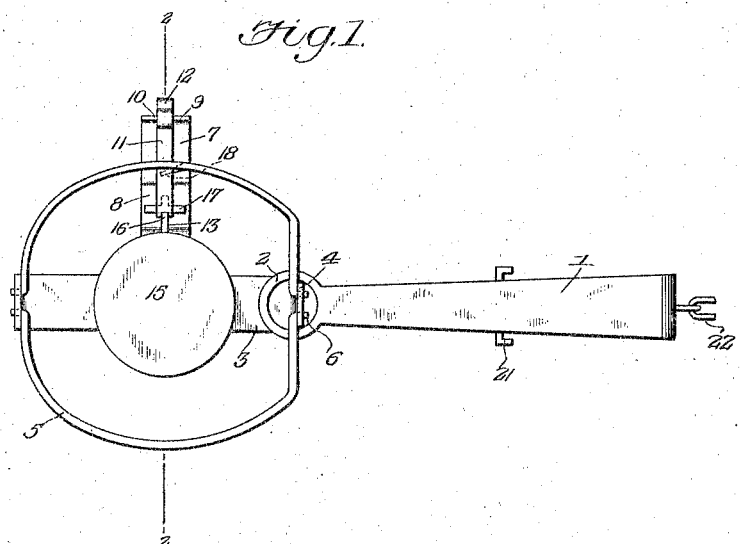
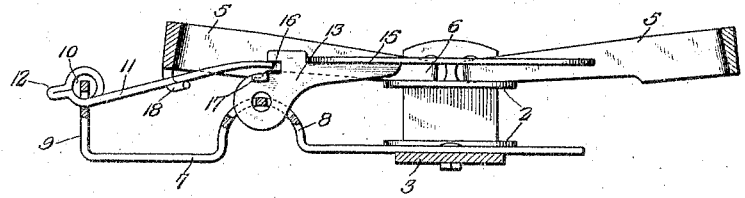
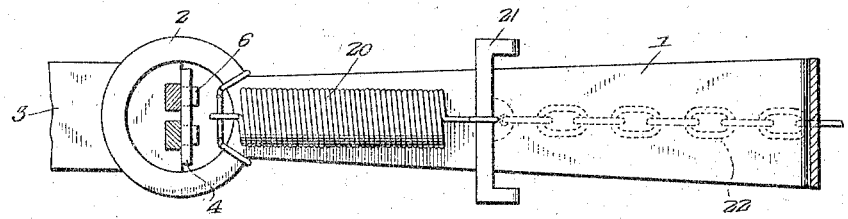
WITNESSES
J. H. Crawford
INVENTORS.
J. R. Elder,
C. W. Elder,
BY
Victor J. Evans
ATTORNEY.

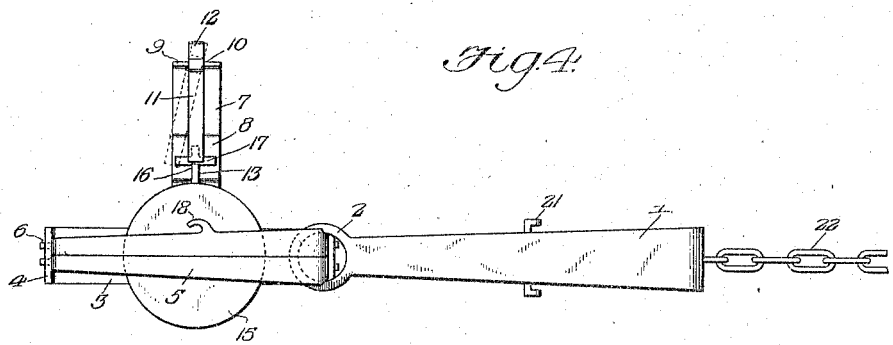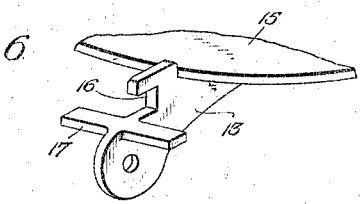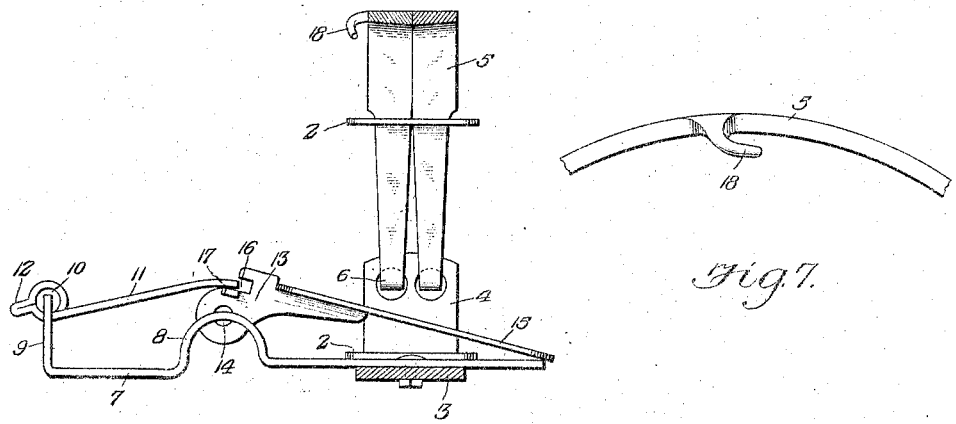

UNITED STATES PATENT OFFICE.

JOHN R. ELDER, OF SIOUX CITY, AND GEORGE W. ELDER, OF FOREST CITY, IOWA.

ANIMAL-TRAP.

1,307,963.      Specification of Letters Patent.      Patented June 24, 1919.

Application filed March 10, 1919. Serial No. 281,635.

*To all whom it may concern:*

Be it known that we, JOHN R. ELDER and GEORGE W. ELDER, citizens of the United States, residing at Sioux City, in the county of Woodbury, and Forest City, in the county of Winnebago and State of Iowa, have invented new and useful Improvements in Animal-Traps, of which the following is a specification.

One of the objects of our invention is the provision of a jaw trap in which premature springing of the trap is reduced to a minimum if not practically eliminated, this because of the relation of the keeper member to the adjacent jaw.

Another object is the provision in such a trap of simple means for facilitating the setting of the trap.

Another object is the provision of means for assuring prompt springing of the trap when the trigger pan is depressed.

To the attainment of the foregoing the invention consists in the peculiar construction, novel combination and adaptation of parts as hereinafter described and definitely claimed.

In the accompanying drawings hereby made a part hereof:

Figure 1 is a plan view of our novel trap, showing the same as set.

Fig. 2 is an enlarged transverse section of the same taken in the plane indicated by the line 2—2 of Fig. 1.

Fig. 3 is an enlarged detail section illustrative of a feature hereinafter explicitly alluded to.

Fig. 4 is a plan view showing the trap as sprung.

Fig. 5 is an enlarged transverse section taken at right angles to Fig. 4 and showing some of the parts in elevation.

Fig. 6 is an enlarged perspective showing a portion of the trigger.

Fig. 7 is a detail perspective showing the disposition relative to the jaw of the finger that is engaged by the keeper member.

Similar numerals of reference designate corresponding parts in all of the views of the drawings.

In putting our invention into effect, we prefer to make use of certain well known features, which we believe to be the property of the public. Among these features is the strong loop-shaped spring 1 that terminates in eyes 2; a base plate 3 that has upstanding apertured lugs 4 at its ends, and with the inner lug 4 disposed in the lowermost eye 2; and jaws 5 having journals 6 at their ends disposed in the lugs 4 of the base plate. We are also aware that broadly speaking it is old to provide a trigger with a pan and to combine the said trigger with a keeper member so that when the pan is depressed the keeper member will be released to permit springing of the trap.

One of the features of our invention resides in the peculiar and advantageous springing mechanism which will now be described in detail.

Fixed to and extending laterally from the base plate 3 is a supporting arm 7 having a raised and longitudinally slotted portion 8 at an intermediate point of its length and also having an upstanding portion 9 at its outer end. Pivoted at 10 to said upstanding portion 9, Fig. 2, is a vertically swinging keeper member 11 on the heel of which is a stop projection 12 adapted to contact against the outer side of the portion 9 and thereby limit the upward movement of the member 11 when the trap is sprung. In other words the stop projection 12 precludes the possibility of the springing of the trap throwing the member 11 outwardly and downwardly so that it is necessary in setting the trap to first take hold of and swing the member 11 upwardly and inwardly to its working position. Again it will be noticed that by virtue of the provision stated the member 11, immediately after a springing of the trap, will gravitate to its working position. The vertically swinging trigger 13 is pivoted to the upwardly extending portion 8 of arm 7 in the longitudinal slot thereof, as indicated by 14 in Fig. 2. Said trigger 13 carries the pan 15 and is provided with a kerf 16 to receive the free end of the member 11. It will also be noticed that by comparison of Figs. 2 and 6 that the trigger 13 is provided above its center of movement with lateral rests 17 which are disposed flush with the lower wall of the kerf 16, as shown. When the keeper member 11 gravitates after a springing of the trap as before illustrated, it stops upon one of the rests 17 and consequently all that the trapper has to do in completing the setting of the trap is to swing the member 11 inwardly so as to dispose the same in the kerf 16 and also in the finger 18 on the adjacent jaw 5. We would have it understood here that the pivotal connection 10 of the member 11 is such as to permit free lateral and edgewise play of the keeper member 11; such play being necessary to the manipulation just referred to. The finger 18 is carried at the outer and lower edge of the jaw 5 and is inclined as best shown in Figs. 5 and 7, in order to facilitate and assure the finger 18 promptly shedding or passing out of engagement with the keeper member 11 when the trap is sprung.

It will be manifest from the foregoing that when the trap is set, as is clearly brought out in Fig. 2, the keeper member 11 and the finger 18 that it engages are both disposed under the adjacent jaw 5. This arrangement of the parts mentioned relative to the jaw 5 is highly advantageous because it practically eliminates premature springing of the trap and makes it practically necessary for an animal to depress the pan 15 in order to spring the trap. In other words there is no liability of the animal springing the trap by direct downward movement of the jaw or of the member 11. On the other hand springing of the trap is only brought about by depression of the pan-bearing portion of the trigger, and in order to effect such depression the animal is in a position where it will be surely caught and strongly held by the jaws when the trap is sprung. To reset the trap after springing thereof, the operator compresses the strong spring 1, and when the finger 18 is in proper position and the pan 15 is slightly raised, the operator simply moves the member 11 inwardly from one of the rests 17 and into the trigger, kerf 16 and also into engagement with the finger 18.

It is a desideratum in the art to so tether the trap that the same will give to the pull of the caught animal, and yet in the event of the spring in the tethering means breaking, the trap will not be released from the stationary object to which it is connected. We attain this desideratum or highly desirable end by the provision of the means best shown in Fig. 3. The said means comprises a retractile spring 20 connected at one end to the adjacent eye 2 of the base plate 3, a slidable member 21 connected to the opposite end of the spring 20 and secured on and movable in the direction of the length of the lower arm of the spring 1, and a chain or other suitable cable 22 connected to the said slidable member 21 and adapted to be fastened or connected in any approved manner to any stationary object for anchoring the trap. It will be manifest that the tethering means described will adequately cushion a pull on the trap when an animal is caught therein; and it will also be apparent that breaking of the spring 20 will not bring about release of the trap and the animal therein from the stationary object. On the other hand in the event of the spring 20 breaking, the slidable member 21 will stop against the bight of the loop-shaped spring 1, and consequently release of the trap will be effectually precluded. From this it follows that when the spring 20 breaks, the trap will be tethered as strongly as before, though of course breakage of the spring 20 will be attended by loss of the shock-absorbing or cushioning capacity of the tethering means.

Having described our invention, what we claim and desire to secure by Letters-Patent, is:

1. In a jaw trap, the combination of a jaw having an inclined finger at its outer and lower edge, spring means for suddenly closing the jaw, a trigger support having a raised portion and a longitudinal slot therein and also having an upstanding outer portion, a trigger pivoted to swing vertically in said slot and having a kerf and also having lateral rests flush with the lower wall of the kerf, a pan on the trigger, and a keeper member movable vertically and laterally on the upstanding portion of the trigger support and having a stop portion to contact against said upstanding portion.

2. In a jaw trap, the combination of a jaw having an inclined finger on its outer and lower edge, a vertically and laterally movable keeper member for engaging said finger and detachably holding the jaw in set position, and means for detachably holding the keeper member against movement.

3. In an animal trap, the combination of an upright support, a vertically swinging keeper member connected with said support and having a stop projection at its outer end adapted to contact against the support below the center of movement of the keeper member to limit the upward movement of the keeper member, and a trigger having a kerf arranged to receive the inner end of said keeper member.

4. In an animal trap, the combination of a trigger having a kerf and also having lateral rests thereon, and a vertically swinging and gravitating keeper member adapted upon gravitation thereof to contact against one of said rests.

5. In an animal trap, the combination of a trigger having a kerf and also having lateral rests, a support, and a vertically and laterally movable keeper member connected with the support and having a stop projection to limit its upward movement.

In testimony whereof we affix our signatures.

JOHN R. ELDER.
GEORGE W. ELDER.

Copies of this patent may be obtained for five cents each, by addressing the "Commissioner of Patents, Washington, D. C."